C. A. WARD.
MOTOR SUPPORT.
APPLICATION FILED JUNE 6, 1919.
1,332,240.
Patented Mar. 2, 1920.
2 SHEETS—SHEET 2.
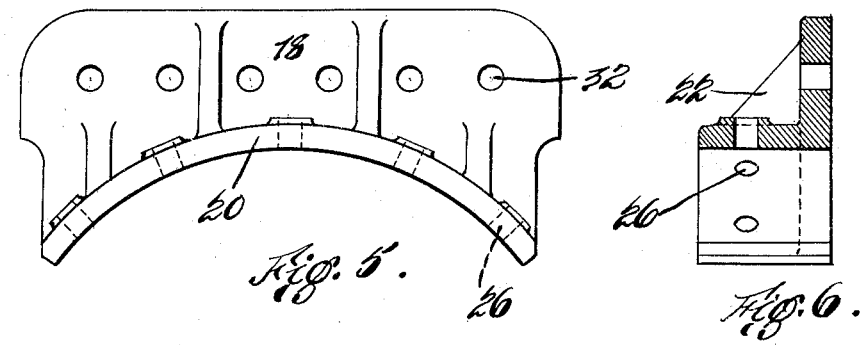
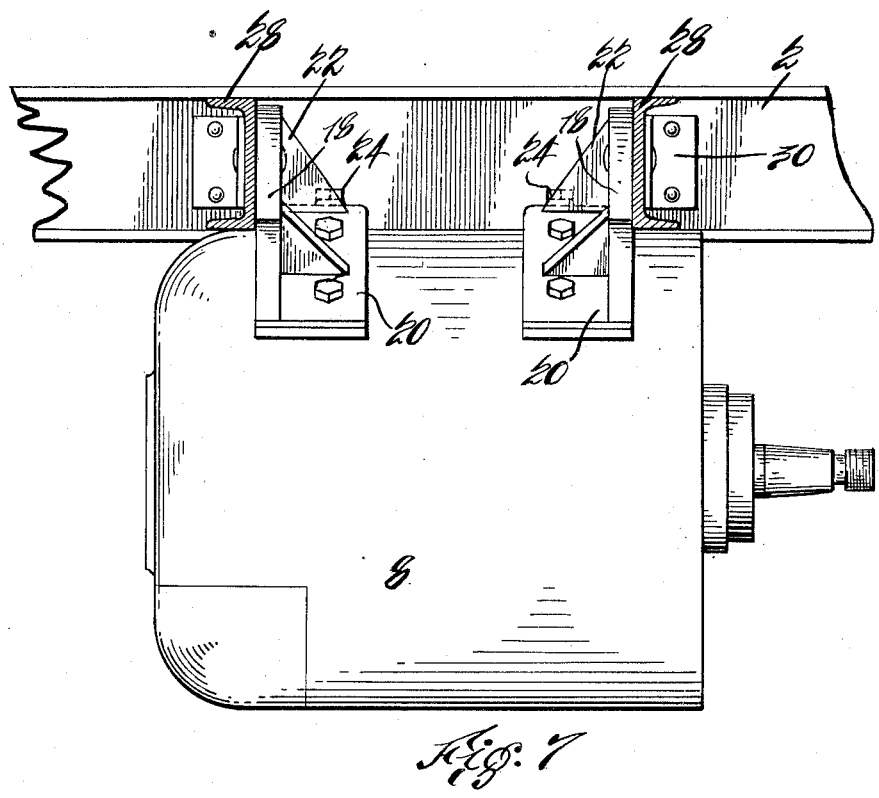
INVENTOR
Charles A. Ward.
BY
N. Dorsey Spencer
ATTORNEY

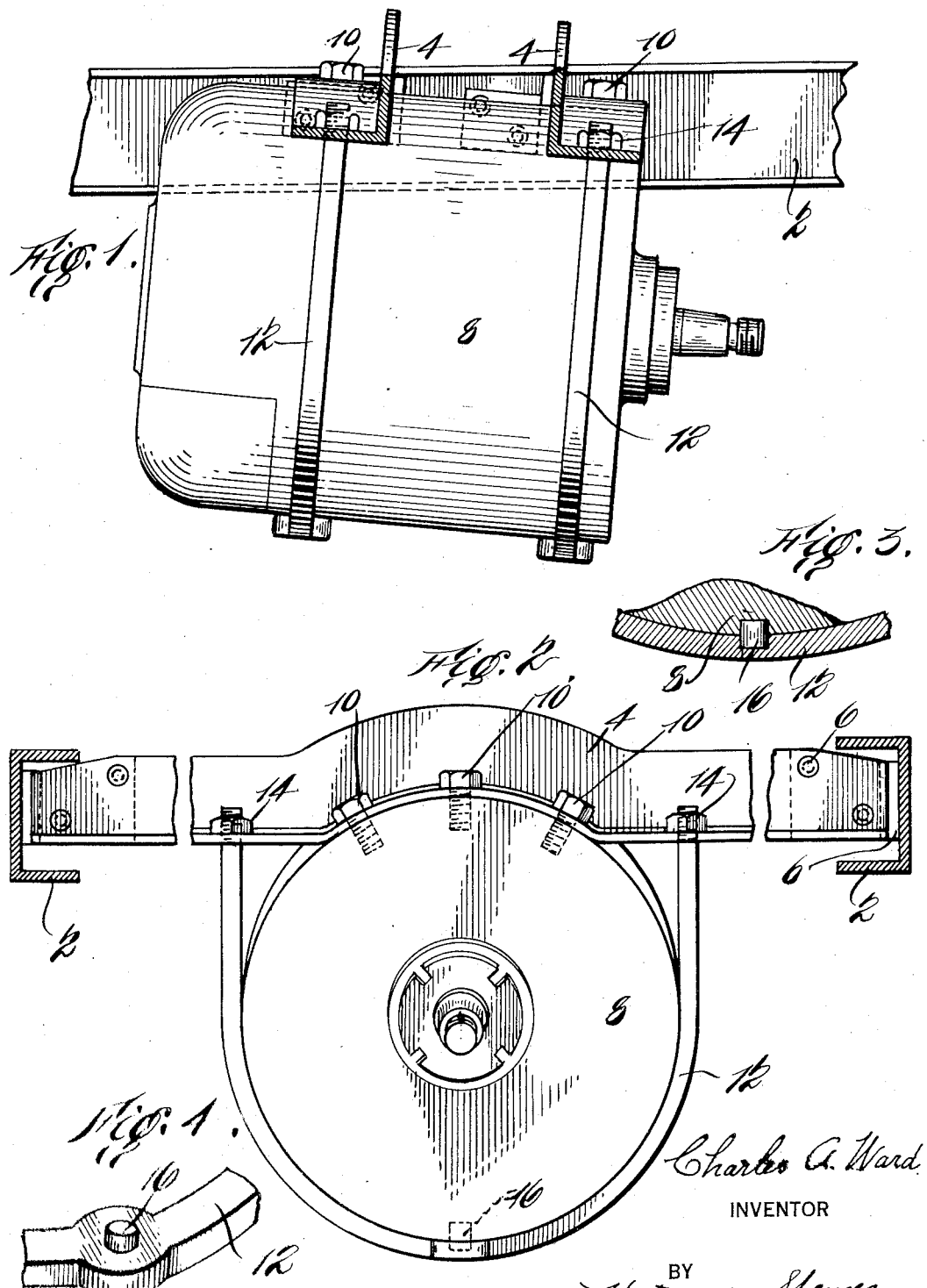

UNITED STATES PATENT OFFICE.

CHARLES A. WARD, OF MOUNT VERNON, NEW YORK.

MOTOR-SUPPORT.

1,332,240.   Specification of Letters Patent.   Patented Mar. 2, 1920.

Application filed June 6, 1919. Serial No. 302,245.

*To all whom it may concern:*

Be it known that I, CHARLES A. WARD, a citizen of the United States, residing at Mount Vernon, N. Y., have invented certain new and useful Improvements in Motor-Supports, of which the following is a clear, full, and exact description.

This invention relates to motor supports which are particularly adapted to support the electric motors of electrically driven vehicles, and a general object of the invention is to provide simple and yet effective means for suspending an electric motor from and securely attaching it to the frame of a vehicle which is to be driven by said motor.

A particular object of the invention is a motor supporting bracket in which there is provision for a most simple and convenient and yet effective attachment to the vehicle frame and which likewise has provision for a simple, convenient and effective attachment to the motor, whereby the motor is securely held both against the shocks and strains incident to the travel of the vehicle and also against the torsional strains incident to its vehicle driving function.

An important feature of the invention is the construction of the motor supporting bracket so that it may be attached to the web portion of a channeled frame cross bar, and, preferably, so that two of these brackets may conveniently be utilized in such manner that the shocks and strains of the vehicle driving action of the motor, as well as those incident to the vehicle movement, will be transmitted to the frame substantially in the plane or planes of said web portions.

Other objects and important features of the invention will appear from the following description and claims when considered in connection with the accompanying drawings, in which—

Figure 1 is a view, partly in side elevation and partly in section, of one form of motor support embodying the present invention;

Fig. 2 is an end view of the motor support illustrated in Fig. 1, that is, looking lengthwise of the vehicle;

Fig. 3 is a sectional detail showing the motor engaging dowel carried by the motor embracing strap which is preferably embodied in the form of motor support shown in Fig. 1;

Fig. 4 is a detail perspective of the aforementioned dowel;

Fig. 5 is a view, in end elevation, of the preferred form of motor supporting bracket embodying the present invention;

Fig. 6 is a substantially central section through the bracket shown in Fig. 5; and Fig. 7 is a side elevation of a motor supported from frame cross bars, shown in section, by brackets of the form illustrated in Fig. 5.

In the form of the invention illustrated in Figs. 1 to 4, inclusive, the side frame members 2, which are shown as comprising channel bars having their web portions arranged vertically and having upper and lower flanges, have attached to the web portions thereof motor supporting brackets 4 of angle shape in cross section, the middle portions of these brackets being shown as curved to fit the upper surface of the motor, both the web and the flange of the bracket being curved. The ends of the brackets are attached to the web portions of the side frame members of the vehicle by angles 6 riveted or bolted respectively to the side frame and to the brackets 4.

The illustrated motor 8, supported by the brackets 4, is shown as slightly inclined to the vehicle frame, but it will be understood that the invention is equally useful in supporting the motor with its shaft in horizontal position.

The primary support of the motor is effected by securing the motor casing 8 to the curved flanges of the brackets 4 in any suitable manner, as, for example, by cap screws 10 passing through openings in the bracket flanges and threaded into the casing 8, Three of these cap screws are shown in Fig. 2, but it will be understood that both the number may be varied and that the length of the arc of curvature of the bracket and, accordingly, the extent of the periphery 8 engaged by the bracket may be varied.

In order to provide a further support for the motor in the form of the invention shown in Figs. 1 to 4, inclusive, particularly against torsional strains, straps 12 passing about the under side of the motor and attached to the flanges of the bracket are provided, the straps having their ends passing through the flanges and having nuts 14 engaging said flanges threaded on said ends. Intermediate between the ends of the straps 12, that is, substantially at the lowermost point of each strap, is preferably a swaged enlargement carrying a dowel 16 entering a correspondingly shaped opening in the under side of the motor casing, the purpose of this dowel being to aid in holding the motor against torsional strains.

In the preferred form of the invention shown in Figs. 5 to 7, inclusive, the straps 12 are dispensed with and an increased supporting surface is provided upon the supporting bracket. In this form of the invention, the supporting bracket is preferably a casting of the form shown in Fig. 5, comprising a vertical web portion 18 having integral therewith a motor engaging flange portion 20 curved to the transverse curvature of the motor casing and closely fitting the surface of said casing when engaged therewith, integral brace portions 22 between the web 18 and flange 20 being also cast with said bracket.

In the preferred form of the invention, the brackets are attached to the motor in substantially the same manner as in the form of the invention hereinabove described, as, for example, by cap screws 24 passing through openings 26 in the flange 20 and threaded into the casing 8 of the motor, except that in the preferred form of the invention the flange 20 extends through a greater arc of the curvature of the motor and a greater number of cap screws are employed in order to secure a more positive connection and a more effective support against both torsional strains and against the shocks and strains incident to the travel of the vehicle.

It will be noted that the brackets shown in the preferred form of the invention are not intended to extend entirely across the vehicle frame, the vertical web portions 18 of these brackets being adapted to be connected to any suitable cross supports upon the frame, as, for example, to the vertical web portion of cross channel bars 28 extending between the two side frame members 2 of the frame and connected at their ends to said frame members by suitable angles or brackets 30 riveted to the web portions of said side channels and cross channels respectively. The attachment of the vertical web portions 18 of the motor supporting brackets to the vertical web portions of the cross channels 28 may be effected in any suitable manner as, for example, by bolts or rivets passing through the openings 32 in the webs 18 and through corresponding openings in the web portion of the cross channels 28.

From the foregoing description it will be seen that a very simple and convenient and yet effective motor support has been provided which has a most simple and yet positive attachment to the motor and a correspondingly simple and effective attachment to the vehicle frame. Moreover, by attaching the vertical web portions 18 of the brackets to the vertical web portions of the cross channels 28 and spacing the brackets in the manner shown in Fig. 7, a motor support has been provided in which both the torsional strains and the strains and shocks incident to the vehicle travel are transmitted to the vehicle frame substantially in the planes of these vertical web portions and thus a most effective resistance to frame distortions is provided.

Having thus described my invention, what I desire to claim and secure by Letters Patent is:

1. In a motor support, the combination with the framing of a vehicle, including side members each having a vertical web and lateral flanges, of motor supporting cross members carried by the web portions of said framing, flanges carried by said cross member shaped to fit the transverse contour of the motor casing and motor fastening means connecting said flanges to said motor casing.

2. In a motor support, the combination with the framing of a vehicle, including side members each having a vertical web and lateral flanges, of motor supporting angles including web portions substantially normal to the motor axis, means connecting the web portions of said motor supporting angles to the web portions of said framing, and motor fastening means passing through said angles and into the motor casing and serving to suspend the motor from said angles.

3. In a motor support, the combination with a vehicle frame, including side members, of motor supporting cross members carried by said side members, and motor fastening means passing through said cross members into the motor casing along lines substantially radial with respect to the axis of rotation of the motor, said means serving to suspend the motor from said cross members.

4. In a motor support, the combination with a vehicle frame including side members, of motor supporting cross angles, including vertical web portions and lateral flanges shaped to fit the transverse contour of the motor casing, and motor fastening means passing through said flanges into the motor casing and serving to suspend the motor from said flanges.

5. In a motor support, the combination with a vehicle frame, including side members, of motor supporting cross angles, including vertical web portions and lateral flanges shaped to fit the transverse contour of the motor casing, and motor fastening means passing through said flanges along lines substantially radial to the axis of rotation of said motor and serving to suspend said motor from said flanges.

6. In a motor support, the combination with the framing of a vehicle, including side members each having a web and lateral flanges, of motor supporting angles carried by the web portions of said framing and shaped to fit the transverse contour of the motor casing.

7. In a motor support, the combination with the framing of a vehicle, including side members each having a web and lateral flanges, of motor supporting means comprising angles carried by the web portions of said framing, said angles partly embracing and being connected to the motor casing.

8. A motor support comprising a bracket having a web portion adapted to be attached to a flat part of the vehicle frame and having an integral flange substantially normal to said web portion and curved to fit the motor casing, each of said parts being provided with openings to receive attaching fastenings.

9. A motor support comprising a bracket having a web portion adapted to be attached to a flat part of the vehicle frame and having an integral flange substantially normal to said web portion and curved to fit the motor casing, and integral braces connecting said flange and said web.

10. A supporting bracket for a motor having a substantially cylindrical casing, comprising a web portion adapted to be connected to a flat surface, an integral flange substantially normal to said web portion and curved to fit the curvature of the motor casing, and integral braces between said web and said flange, both said web and said flange being provided with openings to receive attaching fastenings.

11. In a motor driven vehicle, the combination with the vehicle frame comprising side bars having vertical web portions and a motor having a substantially cylindrical casing, of means for supporting said motor comprising a cross bar having a substantially vertical web portion connected to the web portions of the side frame members, and a bracket having a web portion adapted to fit against the web portion of said cross bar and having an integral flange curved to fit the curvature of the motor casing and substantially normal to said web portion of said bracket, and means for attaching the respective parts of said bracket to said cross bar and said motor.

12. In a motor driven vehicle, the combination with the vehicle frame including side frame members having vertical web portions and the motor having a substantially cylindrical casing, of means for supporting said motor from said frame comprising cross bars having web portions substantially normal to the motor axis and extending between and connected to the web portions of the side frame members, motor supporting brackets having web portions adapted to lie flat against the web portions of said cross bars and having integral flanges curved to the curvature of the motor casing, said cross bars being spaced along the motor casing, and means for connecting said webs to said cross bars and said flanges to said casing.

Signed at Mount Vernon, N. Y., this 2nd day of June, 1919.

CHARLES A. WARD.